April 20, 1937.  G. FARINA  2,077,748
HYDRAULIC OPERATING MECHANISM FOR MOTOR VEHICLE BRAKES
Filed Oct. 20, 1934
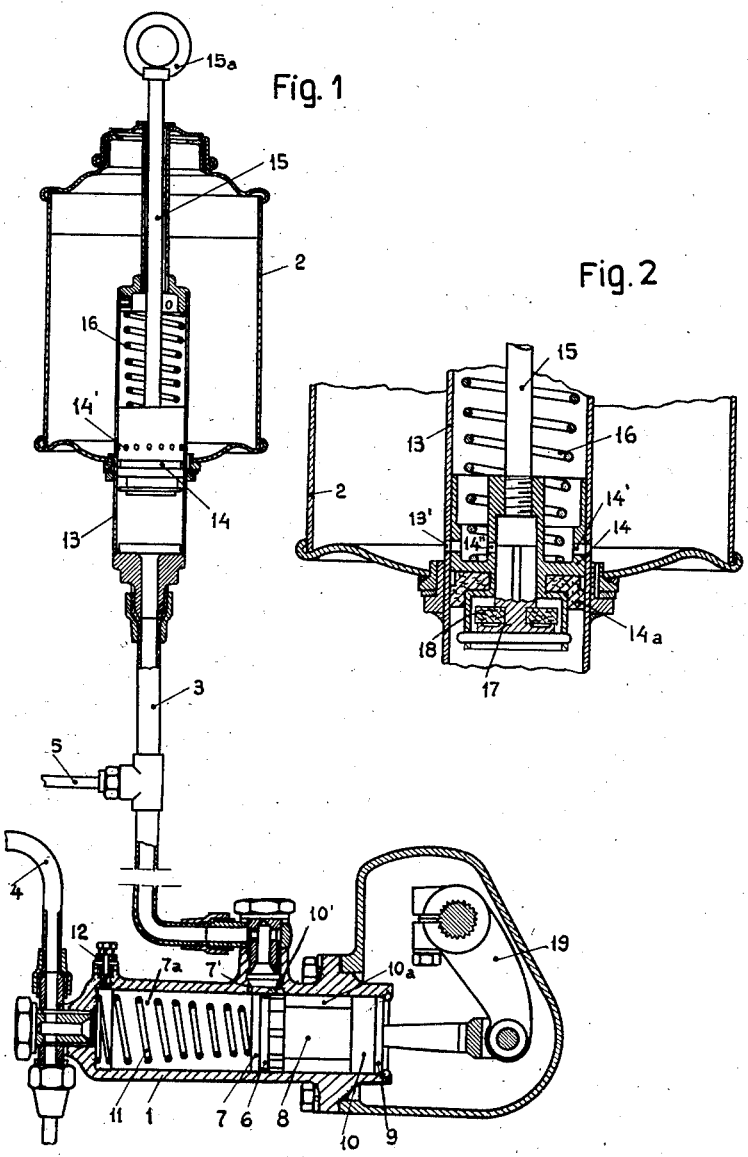
Inventor,
Giovanni Farina
By Sommers & Young - Attys Patented Apr. 20, 1937

2,077,748

UNITED STATES PATENT OFFICE 2,077,748

HYDRAULIC OPERATING MECHANISM FOR MOTOR VEHICLE BRAKES

Giovanni Farina, Turin, Italy

Application October 20, 1934, Serial No. 749,265
In Italy October 23, 1933

3 Claims. (Cl. 60—54.6)

In vehicle brakes any accidental damage should be ascertained and if possible promptly repaired. In a hydraulic transmission for a brake operating mechanism small leakages can occur owing to defective packings, which do not affect the braking efficiency provided the conduit is filled with liquid at the moment of braking.

This invention relates to improvements in hydraulic operating mechanisms for vehicle brakes and its object is to maintain a slight pressure in the conduits even when the brakes are inoperative, in order to make up automatically and promptly for any small leakages that might take place. The user is enabled to ascertain the importance of the leakage and to make a prompt repair.

According to this invention the liquid reservoir is provided with a small pump submitted to the action of a spring which is stretched periodically, say every ten days or a fortnight, by the user of the vehicle. All the liquid filling the conduits is constantly under the action of the spring weighted piston. The user of the vehicle judges from the working of the pump piston if leakage of the conduits remains within the admissible limits. The expansion of the liquid is not hindered by the pump, of which the spring yields to the desired extent under the increase in pressure on the liquid due to its expansion.

The main cylinder of the brake is of valveless construction.

The accompanying drawing shows by way of example the object of this invention.

Figure 1 is a sectional view showing the reservoir and the main cylinder connected together.

Figure 2 shows on an enlarged scale a detail of the pump at the beginning of its pumping stroke.

The main cylinder 1 is connected at one end to the reservoir 2 by the conduit 3 on which a manometric tube 5 can be branched, and at its other end to the brake pipings by the conduit 4.

In the drawing the main cylinder is shown in its inoperative position; its piston 6 is provided with a packing 7 and its rod 8 is guided in the cylinder by a large collar 9 provided with a packing 10. A long chamber 10a is formed between the packings 7 and 10 ahead of the piston and constantly communicates with the tube 3 of the reservoir through the port 10'. The chamber 7a past the piston is connected with the tube 3 only in its inoperative position by the port 7' which is covered as soon as the piston moves further under the action of the brake pedal. The opposing spring 11 is compressed between the cylinder bottom and the piston. No valve is provided on the cylinder, and the vent 12 serves only for discharging air when the cylinder and pipings are first filled with liquid.

The tube 3 does not open directly into the reservoir 2, but leads to the pump casing 13 integral with the reservoir with which it communicates through the holes 13'.

The piston 14 with its packing 14a is introduced through the upper opening of the casing 13 and its rod 15 threaded into the hub of piston 14, projects with its handle 15a through the cover of the reservoir. The piston 14 is pressed by a spring 16 under the action of which the holes 13' are kept covered by the piston, these holes working as inlet ports. The piston is provided with a valve 17 provided with a packing 18, said valve opening during the suction stroke and closing during the compression stroke. The spring is compressed by pulling the rod 15, whereby the holes 14' of the piston are brought opposite the holes 13' of the casing, so that the liquid flows through the holes 13', 14', 14" and the valve 17 into the pump casing 13, the tube 3, the main cylinder, the piping etc. which are thus filled. When the whole system has been filled evacuating the air through suitable vents that are closed after filling, the pump is released to the influence of spring 16 to place the liquid in the whole system under a slight pressure exerted by the spring 16 which brings the holes 14' of the piston below the level of the holes 13', the valve 17 remaining closed owing to the pressure of the liquid past the same. Should any small leakage occur in the piping, this is made up for by the liquid stored in the pump casing 13 under the valve 17. Should an expansion of the liquid occur, this produces through the port 7' of the cylinder an increase in pressure against the piston 14 which is raised compressing the spring 16, the liquid remaining in any case under pressure.

The holes 13' in the cylinder 13 are positioned in such manner that they are uncovered by the piston to connect the reservoir directly with the braking system if the pressure in the system exceeds a predetermined value.

When the brake pedal is operated, it displaces the piston 6 of the main cylinder through the lever 19, forcing the liquid in the chamber 7a into the brake piping 4, thus covering the port 7' and establishing in the chamber 7a a pressure higher than that in the chamber 10a.

When the pedal is released, the piston 6 moves back, establishing an underpressure in the chamber 7a and the liquid in the chamber 10a flows under the action of the spring 16 on the piston 14 of the pump 13 through the packing 7 into the chamber 7a before the latter is filled by the liquid returning from the brakes. The piston 6 uncovers at the end of its stroke the port 7' through which the liquid excess can flow re-establishing the balance between the chambers 7a and 16a. The piston 14 of the pump 13 shall thus have performed a stroke to and fro without ever causing the pressure in the piping to sink below that due to the spring 16. As said above leakage is made up for as it occurs by the effect of the downstroke of the piston 14 of the pump 13. Every time the user of the vehicle has an opportunity to lift the engine and hood he may ascertain the amount of liquid escaped by leakage by looking at the length of the rod 16 projecting through the reservoir; this verification will be facilitated by providing the rod with reference marks. Unless leakage is abnormal, it will suffice to act periodically upon the pump.

The constructive details of the main cylinder and reservoir may vary from the example described and shown in the drawing without departing from the scope of this invention.

What I claim is:

1. In a hydraulic braking mechanism, the combination with a master control cylinder, a master piston in said master cylinder and a reservoir for supplying the fluid to said master cylinder, of a pump cylinder arranged in the reservoir and in communication with said master cylinder in front of the master piston when said master piston is in non-operative position, said pump cylinder being provided with a port opening into the reservoir, a spring-pressed pump piston in said pump cylinder, said pump piston having an opening to provide communication between the reservoir and pump cylinder when said port and opening are in register, said pump piston having a bore therethrough from its upper to its lower side, and a free valve to close said bore when the pump piston is pressed downwardly and opening said bore when the piston is drawn upwardly.

2. In a hydraulic braking system, more particularly for motor vehicles, a feed tank, a pump cylinder having a circular row of ports providing constant communication with said tank, a piston movable in said cylinder and controlling said ports, a spring acting on the piston to maintain a predetermined elastic pressure in the braking system and a check valve in said piston to prevent return of fluid from the braking system to the pump, said ports being situated in such manner that they are uncovered by the piston to connect the tank directly with the braking system if the pressure in the system exceeds a predetermined value.

3. In a hydraulic braking system, more particularly for motor vehicles, a feed tank, a pump cylinder having a circular row of ports providing constant communication with said tank, a slide valve piston movable in said pump cylinder, said slide valve piston being provided with a circular row of holes which in a position of the slide valve piston register with the ports in the cylinder to permit passage of a predetermined quantiy of fluid from the tank into the space in the cylinder above the piston, a spring in said space acting on the slide valve piston to maintain an elastic pressure in the braking system and a check valve in said slide valve piston to permit passage of the fluid from the pump into the braking system when the piston is lifted and to prevent passage in the opposite direction when the piston descends in the cylinder, said holes being arranged in such manner that they are uncovered by the slide valve piston to directly connect the tank with the braking system if the pressure in the latter exceeds a predetermined value.

GIOVANNI FARINA.